(12) United States Patent
Moberg et al.

(10) Patent No.: US 8,210,590 B1
(45) Date of Patent: Jul. 3, 2012

(54) DOUBLE HINGE STORAGE POCKET

(75) Inventors: Joshua L. Moberg, Milan, MI (US);
Aaron S. Park, Ann Arbor, MI (US);
Benjamin D. Jimenez, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/354,931

(22) Filed: Jan. 20, 2012

(51) Int. Cl.
B60J 7/00 (2006.01)

(52) U.S. Cl. ..................................... 296/37.13; 224/544

(58) Field of Classification Search .................. 296/37.5, 296/37.12, 37.13, 37.15, 37.6; 224/543, 224/544
See application file for complete search history.

(56) References Cited

U.S. PATENT DOCUMENTS

| | | |
|---|---|---|
| 1,589,230 A | 6/1926 | Roedding |
| 3,730,581 A | 5/1973 | Parkinson |
| 4,453,760 A | 6/1984 | Hira |
| 4,619,477 A | 10/1986 | Kneib et al. |
| 4,712,823 A | 12/1987 | Mills et al. |
| 5,072,983 A | 12/1991 | Muroi et al. |
| 5,261,716 A | 11/1993 | Phelps |
| 5,795,005 A | 8/1998 | Garfias et al. |
| 6,120,077 A | 9/2000 | Westphal et al. |
| 6,926,332 B2 * | 8/2005 | Youngs et al. ............. 296/37.13 |
| 7,063,367 B2 | 6/2006 | Wakou et al. |
| 7,371,341 B2 | 5/2008 | Youngs et al. |
| 7,494,033 B2 | 2/2009 | Kaiser |

* cited by examiner

Primary Examiner — Joseph Pape
(74) Attorney, Agent, or Firm — Brinks Hofer Gilson & Lione

(57) ABSTRACT

A trim panel assembly for an automotive vehicle having a pocket door that is moveable between a reduced width position and an increased width position. The trim panel assembly includes a panel having a recessed portion. A pocket door is mounted over at least a portion of the recessed portion such that the pocket door and the recessed portion define a storage pocket. The pocket door is mounted for translational movement between first and second positions. In the first position, the storage pocket has a first width defined between an outboard side wall and an inboard side wall. In the second position, the width of the storage pocket is increased. This increase in width occurs over the vertical extent of the storage pocket.

18 Claims, 2 Drawing Sheets

DOUBLE HINGE STORAGE POCKET

BACKGROUND

1. Field of the Invention

The present invention generally relates to a storage compartment incorporated into a vehicle. More specifically, the invention relates to a storage compartment or door pocket in an automotive vehicle wherein the storage compartment has a moveable door that in one position increases the interior volume of the storage compartment.

2. Description of Related Art

Automotive doors are often constructed so as to include various aesthetic and functional features. Examples of aesthetic features include the covering of various interior surfaces with materials such as plastic, fabric, leather, wood or chrome. Functional features may include such items as cup holders, armrests and map or storage pockets.

These storage pockets provide convenient locations within the interior of the vehicle for passengers to store items that may be needed either during travel or after arrival at their destination. While the storage pockets are often fixed in nature, meaning that their size is not changeable, some storage packets include an articulating door or cover. Typically, these doors pivot inwardly from a lowermost edge of the door, that is, into the interior of the vehicle. When moved into this inwardly displaced position, the door provides an increased width in the mouth portion of the storage pocket. This increase in width provides the vehicle occupant with an easier reach inside and access articles in the storage pocket.

While the mouth portion of the storage compartment increases in width, the width of the bottom of the storage compartment remains the same. This results in a wedge shaped storage compartment. Obviously, such a wedge shaped storage compartment limits the size and nature of the articles and the depth at which some articles can be placed therein.

SUMMARY

The present invention relates to the construction of a storage compartment or pocket as might be found in an automotive vehicle. According to one aspect of the invention, an automotive trim panel assembly is provided with a panel that has an exterior surface for facing the vehicle interior. The panel itself including a recessed portion and a pocket door mounted to the panel over at least a portion of the recessed portion. As such the pocket door and the recessed portion cooperate to define a storage pocket in the panel assembly. The storage pocket is further seen as having a bottom wall, an outboard side wall, and an inboard side wall, with the outboard side wall being defined by the recessed portion and the inboard side wall being defined by the pocket door. The pocket door is mounted to the panel for translational movement between a first position and a second position. In the first position, the storage pocket has a reduced width, which is defined as the width between the outboard side wall and the inboard side wall. In the second position, the storage pocket has an increased width, which is similarly defined between the outboard side wall and the inboard side wall. Because of the construction of the pocket door, the second width is greater than the first width at both top and bottom extents of the pocket.

In a further aspect of the invention, the pocket door includes a top portion and a bottom portion, the top portion being moveable relative to the bottom portion.

In another aspect of the invention, the top portion is hinged to the bottom portion.

In still another aspect of the invention, the bottom portion is hinged to the panel.

In yet a further aspect of the invention, the bottom portion of the pocket door forms a portion of the bottom wall of the storage pocket in the second position.

In another aspect of the invention, the top portion in the first position is generally parallel to the top portion in the second position.

In yet another aspect of the invention, the bottom portion in the first position is generally perpendicular to the bottom portion in the second position.

In a further aspect of the invention, the width of the storage pocket increases in an amount equal to a width of the bottom portion.

In a still further aspect of the invention, the storage pocket has a height measured from the bottom wall to an upwardly open mouth, the storage pocket having an increased width at the bottom wall and at the mouth in the second position relative to widths in the first position.

In another aspect, the invention provides a vehicle storage compartment assembly including a panel that defines at least a part of the vehicle. The panel further includes a recess over at least a portion of which is mounted a storage door. The storage door, in conjunction with the recess, defines a storage compartment in a portion of the vehicle. The storage compartment has a bottom wall, end walls and opposed side walls. The opposed side walls are respectively defined by portions of the panel and the storage door. The storage door is mounted to the panel for translational movement between a closed position and an open position. In the closed position, the storage door defines a first width of the storage compartment, which is determined between the opposing side walls. In the second position, the storage door defines a second width of the storage compartment, which is also determined between the opposing side walls. The second width is greater than the first width at both top and bottom extents of the storage compartment.

Further objects, features and advantages of this invention will become readily apparent to persons skilled in the art after a review of the following description, with reference to the drawings and claims that are appended to and form a part of this specification.

DETAILED DESCRIPTION

Figure 1:
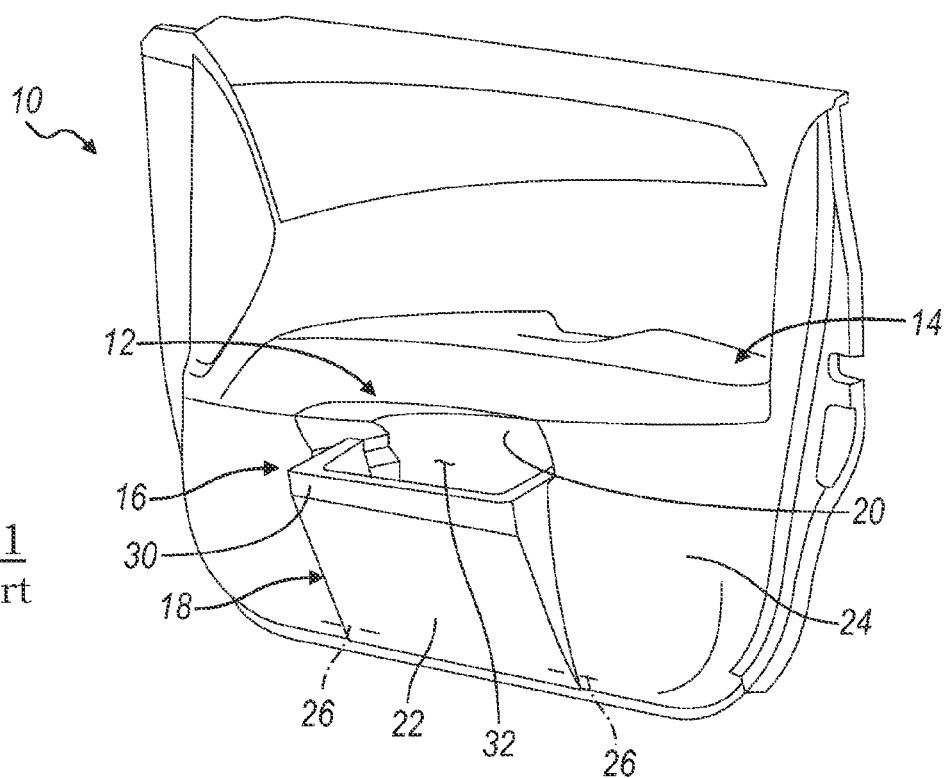
FIG. 1 is perspective interior view of a door of an automotive vehicle in which the door includes a storage pocket according to the prior art.

Referring now to the drawings, FIG. 1 illustrates a door 10 of an automotive vehicle as would be viewed from the interior of the vehicle. The door 10 includes various features, one of which is a storage or map pocket assembly 12 located beneath an armrest 14.

The storage pocket assembly 12 is defined by a portion of a trim panel 16 and a pocket door 18. The pocket door 18 is located so as to at least partially cover a recess 20 formed in the trim panel 16.

The pocket door 18 is mounted to be movable between two positions. In one position, an exterior surface 22 of the pocket door 18 is preferably flush with the exterior surface 24 of the trim panel 16. This position may be referred to as the closed position. In its second position, as is seen in FIG. 1, the pocket door 18 has been pivoted inward of the vehicle and away from the recess 20 in the trim panel 16. This position may be referred to as the open position. To achieve this movement, the pocket door 18 is mounted via a pivot connection 26 generally located toward the lower extent 28 of the pocket door 18. When moved to the second position, the upper extent 30 of the pocket door 18 defines an upwardly open mouth 32 that is large in comparison to the size of the mouth 32 when the pocket door 18 is in its closed or first position. By moving the pocket door 18 to its open or second position, the enlarged size of the mouth 32 allows for easier access into the storage area of the storage pocket assembly 12. While this position also does allow for the placement of larger items into the storage pocket assembly 12, it is seen that as one progresses down into the depth of the storage pocket 12, the width of the compartment therein decreases. Larger items therefore can only be partially placed in the storage pocket 12 and may extend out of the storage pocket in a manner that could interfere with closing of the door or the utilization of all the features provided on the armrest 14.

Figure 2:
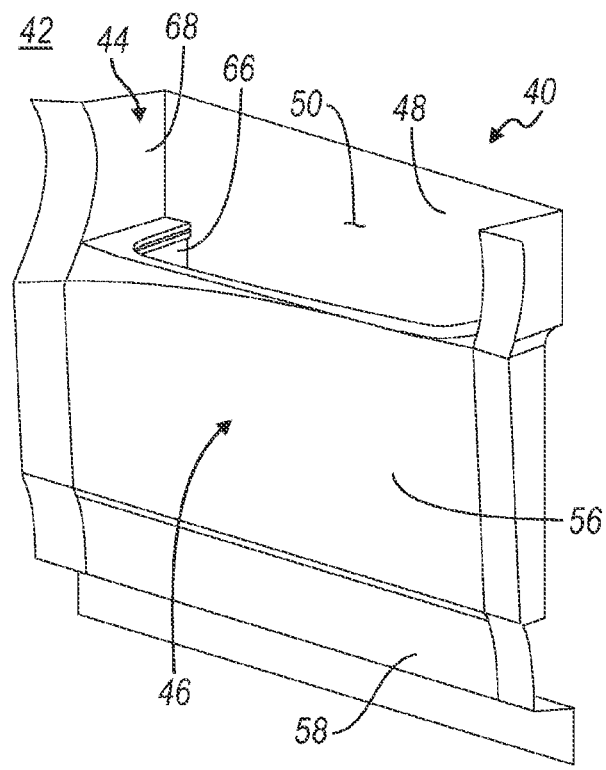
FIG. 2 is perspective interior view of a door of an automotive vehicle in which the door includes a storage pocket embodying the principles of the present invention and in which a pocket door of the storage pocket in a closed or first position.
Figure 3:
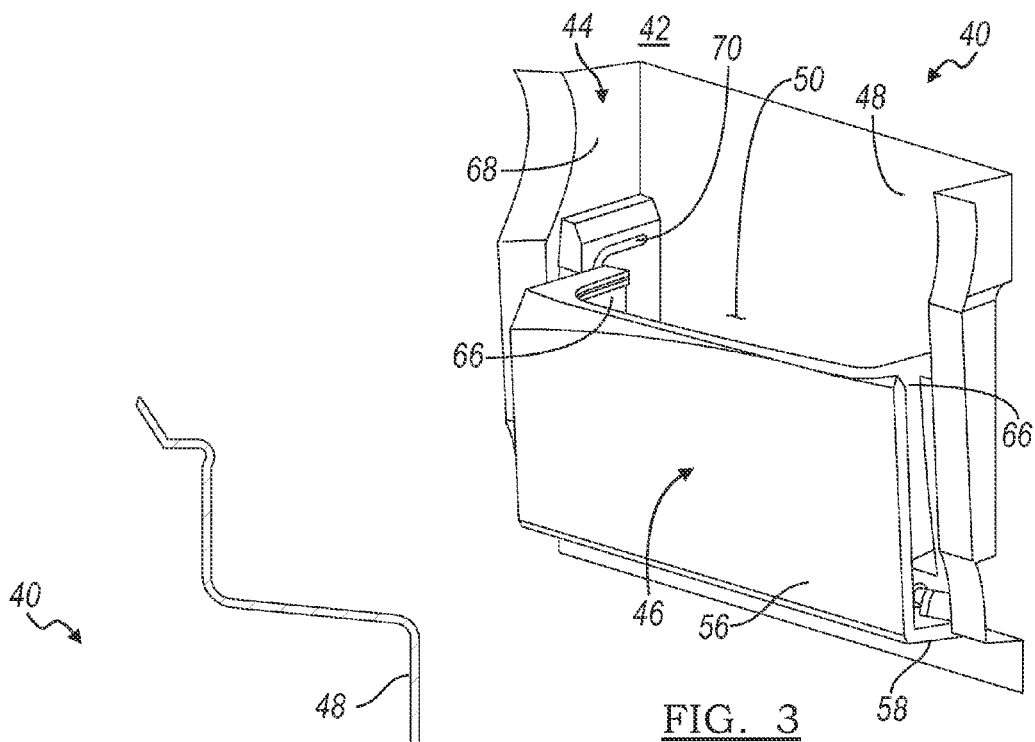
FIG. 3 is perspective view similar to FIG. 2 with a pocket door of the storage pocket in an open or second position.
Figure 4:
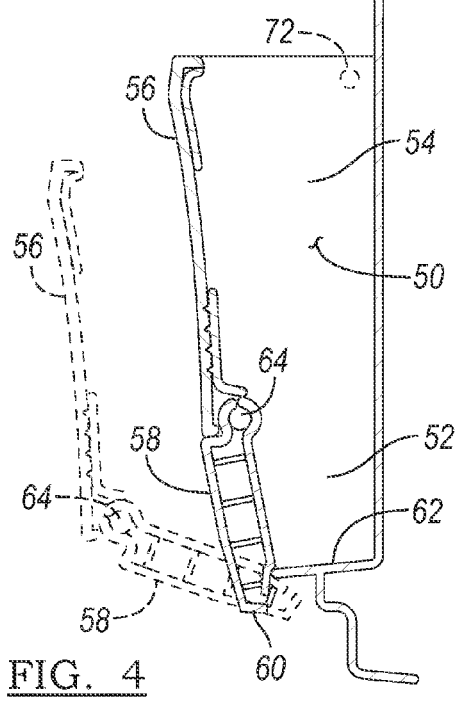
FIG. 4 is cross sectional view of the pocket door seen in FIGS. 2 and 3 and shown in both the closed and open positions.

Referring now to FIGS. 2 through 4, a storage pocket or compartment 40 constructed in accordance with the principles of the present invention is generally illustrated therein. While illustrated as being integrated with a vehicle door 42, it will be understood from this description that the storage pocket 40 can be incorporated into other locations of the vehicle. For example and without limitation, the storage pocket 40 could be provided in a rear quarter trim panel, on the rear side of a seat backrest, in the bed wall of a pickup truck or even in an exterior fender portion of a vehicle.

As its primary components, the storage pocket 40 includes a trim panel 44 in a pocket door 46. The pocket door 46 is mounted to the trim panel 44 so as to be movable between two positions. The first of these positions is generally referred to as a closed or reduced width position and is illustrated in FIG. 2. The second of these positions is generally referred to as an open or increased width position and is seen in FIG. 3. The closed and open positions are likewise both shown in the cross-sectional view of FIG. 4.

As seen in the figures, the trim panel 44 is provided with a recess 48 and the pocket door 46 is mounted so as to extend over at least a portion of this recess 48. As a result, the pocket door 46 cooperates with the recess 48 to define the compartment cavity 50 of the storage pocket 40.

In its closed position, the interior surfaces of the pocket door 46 cooperate with the exterior surface of the recess 48 to define a reduced width for the compartment cavity 50. This reduced width is generally illustrated in FIG. 4 where the pocket door 46 is drawn in solid lines. As seen herein, the compartment cavity 50 generally has a constant width from the lower extent 52 to the upper extent 54 of the compartment cavity 50. By virtue of the present invention, when the pocket door 46 is in its open position, as seen in phantom in FIG. 4, the compartment cavity 50 exhibits an increased width, but unlike the prior art, its increased width is generally co-extensive with the entire height of the compartment cavity 50, that is from its lower extent 52 to its upper extent 54. As previously mentioned, in the prior art, moving of the pocket door 18 to its open position results in the formation of a wedge shaped compartment wherein the upper extent of the compartment exhibits an increased, but the lower extent of the compartment remains substantially the same width as when the pocket door 18 was closed.

To achieve this increased width in the lower extent 52, the pocket door 46 is hinged at two places. This double hinging not only mounts the pocket door 46 to the trim panel 44, but also provides for a hinging action in an intermediate portion of the pocket door itself.

More specifically, the pocket door 46 includes two door portions, which are herein referred to as a primary part 56 and a secondary part 58. When mounted in a vehicle door 42, or elsewhere in a vehicle, the primary part 56 is generally located vertically above the secondary part 58. As such, the primary part 56 may be referred to as an upper portion of the pocket door 46 and the secondary part 58 may be referred to as a lower portion of the pocket door 46. For convenience, its upper and lower designation will be used herein when referring to the primary and secondary parts 56, 58.

The lower part 58 is generally rectangular in shape and is connected to the trim panel 44 so as to pivot about a lower pivot axis 60, which is provided along a lower interface between the lower part 58 and a bottom wall 62 of the trim panel 44. This pivotable mounting can be formed in a variety of ways including incorporating pins extending through bosses formed on both the lower part 58 and the trim panel 44. As an alternative to the pin and boss construction, a piano hinge maybe provided across the entire length of the lower part 58 or the lower part 58 maybe connected to the trim panel 44 through a live hinge.

The lower part 58 is also connected to the upper part 56 of the pocket door 46. This is done along an upper pivot axis 64, which is parallel to the lower pivot axis 60. The upper pivot axis 64 provides for a connection point along an upper edge of the lower part 58 and a lower edge of the upper part 56. This pivotable connection maybe similarly formed in a variety of constructions, including all of those previously mentioned relative to the lower pivot axis.

The upper part 56 of the pocket door 18 includes a pair of opposed end walls 66 on its lateral ends. These end walls 66 are generally oriented perpendicular to the main body of the upper part 56. As a result of this orientation, the end walls 66 are generally aligned with and adjacent to end walls 68 partially defining the recess 48 of the trim panel 44. The end walls 66 and 68 are engaged with one another to control the movement of the pocket door 46 from its closed position to its open position. This control is achieved by defining an arcuate slot 70 in the end wall 68 of the trim panel 44 and providing a pin 72 extending from the end walls 66 into the slots 70, or vice versa. During operation, as the pocket door 46 is moved from its closed position to its open position, the pins 72 correspondingly move from one end of the slot 70 to the other end thereof. The ends of the slots 70, therefore determine the relative positions of the upper and lower parts 56 and 58 of the pocket door as well.

As previously noted, the slots 70 are arcuate in their shape and this arc generally proceeds outward from a rear wall 74 of the recess then downward towards the bottom wall 62 of the recess 48. By providing the slot 70 in this manner, the upper portion of the upper part 56 of the pocket door is moved outward and downward as the pocket door 46 moves from its closed position to its open position. Notably, the curvature of the slot 70 is not the same as the radius of curvature that otherwise would be defined by the pins 72 if the pocket door 18 was one piece and rotated solely about the lower pivot axis 60. Rather, the radius of curvature of the slot 70 is less and its curvature is more pronounced. Because of this curvature of the slot 70 and because of the pivotable connection between the upper part 56 and the lower part 58 of the pocket door 18, as the pocket door 46 is moved from its closed position to its open position the upper part 56 also pivots relative to the lower part 58 of the pocket door 18. The extent of this relative movement generally allows the lower part 58 to move from an upright position to a generally horizontal position where the lower part 58 operates as an extension of the bottom wall 62.

By controlling the locations of the ends of the slots 70, as well as the relative distances between the pins 72, the upper pivot axis 64 and the lower pivot axis 60, it is possible to control the orientation upper and lower parts 56 and 58 during their movement. As seen in the figures, these factors are controlled so as to provide for a translational movement of the upper part 56 of the pocket door from its closed position to its open position. As illustrated, the upper part 56 of the pocket door 46 is oriented substantially parallel to itself in each of these positions. In this manner, the width of the compartment cavity 50 is generally uniformly increased from the lower extent 52 to the upper extent 54 of the cavity 50 when the pocket door 46 is in the open position. By increasing the width of the lower extent 52 of the compartment cavity in conjunction with increasing the width of the upper extent 54 of the compartment cavity, full placement of an article within the compartment cavity 50 is not constricted by the lower extent of the cavity 50 being narrower than the upper extent.

While the upper part 56 of the pocket door 46 is illustrated as having parallel position in its open and closed positions, the construction could be such that the upper part 56 would not be exactly parallel in these positions.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A trim panel assembly for an automotive vehicle, the trim panel assembly comprising:
    a panel having an exterior surface to face interiorly of the vehicle, the panel defining at least a portion of a side of the trim panel assembly, the panel including a recessed portion;
    a pocket door mounted to the panel over at least part of the recessed portion such that the pocket door and the recessed portion define a storage pocket in the panel assembly, the storage pocket having a bottom wall, an outboard side wall, and an inboard side wall, the outboard side wall being defined by the recessed portion and the inboard side wall being defined by the pocket door;
    the pocket door being mounted to the panel so as to be translationally moveable between a first position and a second position, in the first position the pocket door defining a first width of the storage pocket between the outboard side wall and the inboard side wall, in the second position the pocket door defining a second width of the storage pocket between the outboard side wall and the inboard side wall, the second width being greater than the first width at both top and bottom extents of the pocket door.

2. The automotive trim panel assembly of claim 1, wherein the pocket door includes a top portion and a bottom portion, the top portion being moveable relative to the bottom portion.

3. The automotive trim panel assembly of claim 2, wherein the top portion is hinged to the bottom portion.

4. The automotive trim panel assembly of claim 2, wherein the bottom portion is hinged to the panel.

5. The automotive trim panel assembly of claim 2, wherein the bottom portion forms an extension of the bottom wall of the storage pocket in the second position.

6. The automotive trim panel assembly of claim 2, wherein the top portion in the first position is generally parallel to the top portion in the second position.

7. The automotive trim panel assembly of claim 2, wherein the bottom portion in the first position is generally perpendicular to the bottom portion in the second position.

8. The automotive trim panel assembly of claim 2, wherein the width of the storage pocket increases in an amount equal to a width of the bottom portion.

9. The automotive trim panel assembly of claim 1, wherein the storage pocket has a height measured from the bottom wall to an upwardly open mouth, the storage pocket having an increased width at the bottom wall and at the mouth in the second position relative to the first position.

10. A vehicle storage compartment comprising:
    a panel defining at least a portion of the vehicle, the panel including a recessed portion;
    a pocket door mounted to the panel over at least part of the recessed portion such that the pocket door and the recessed portion define a storage pocket, the storage pocket having a bottom wall, an outboard side wall, an inboard side wall, the outboard side wall being defined by one of the panel and the pocket door and the inboard side wall being defined by the other of the panel and the pocket door;
    the pocket door being mounted to the panel so as to be translationally moveable between a first position and a second position, in the first position the pocket door defining a first width of the storage pocket as measured between the outboard side wall and the inboard side wall, in the second position the pocket door defining a second width of the storage pocket between the outboard side wall and the inboard side wall, the second width being greater than the first width at both top and bottom extents of the pocket door.

11. The vehicle storage compartment of claim 10, wherein the pocket door includes a top portion and a bottom portion, the top portion being moveable relative to the bottom portion.

12. The vehicle storage compartment of claim 11, wherein the top portion is hinged to the bottom portion.

13. The vehicle storage compartment of claim 11, wherein the bottom portion is hinged to the panel.

14. The vehicle storage compartment of claim 11, wherein the bottom portion forms an extension of the bottom wall of the storage pocket in the second position.

15. The vehicle storage compartment of claim 11, wherein the top portion in the first position is generally parallel to the top portion in the second position.

16. The vehicle storage compartment of claim 11, wherein the bottom portion in the first position is generally perpendicular to the bottom portion in the second position.

17. The vehicle storage compartment of claim 11, wherein the width of the storage pocket increases in an amount equal to a width of the bottom portion.

18. The vehicle storage compartment of claim 10, wherein the storage pocket has a height measured from the bottom wall to an upwardly open mouth, the storage pocket having an increased width at the bottom wall and at the mouth in the second position relative to the first position.

* * * * *